US008891668B2

(12) United States Patent
Premakanthan et al.

(10) Patent No.: US 8,891,668 B2
(45) Date of Patent: Nov. 18, 2014

(54) SYSTEM AND METHOD FOR ESTIMATING AND CORRECTING PHASE SHIFT IN A WIRELESS COMMUNICATION DEVICE

(75) Inventors: Pravin Premakanthan, Chandler, AZ (US); Mahib Rahman, Chandler, AZ (US); Mark Kirschenmann, Chandler, AZ (US)

(73) Assignee: Intel IP Corporation, Santa Clara, CA (US)

( * ) Notice: Subject to any disclaimer, the term of this patent is extended or adjusted under 35 U.S.C. 154(b) by 216 days.

(21) Appl. No.: 13/173,972

(22) Filed: Jun. 30, 2011

(65) Prior Publication Data

US 2013/0003891 A1 Jan. 3, 2013

(51) Int. Cl.
*H04K 1/02* (2006.01)
*H04B 1/04* (2006.01)

(52) U.S. Cl.
USPC .......................................... 375/296; 455/114.3

(58) Field of Classification Search
USPC ................. 375/295, 296, 354, 355, 371, 373; 455/91, 114.2, 114.3
See application file for complete search history.

(56) References Cited

U.S. PATENT DOCUMENTS

| 6,313,703 | B1 * | 11/2001 | Wright et al. | 330/149 |
|---|---|---|---|---|
| 7,382,834 | B2 | 6/2008 | Dawson et al. | 375/296 |
| 8,306,487 | B2 * | 11/2012 | Lozhkin | 455/114.3 |
| 2003/0174783 | A1 * | 9/2003 | Rahman et al. | 375/298 |
| 2009/0186582 | A1 * | 7/2009 | Muhammad et al. | 455/63.1 |
| 2010/0135449 | A1 * | 6/2010 | Row et al. | 375/371 |

FOREIGN PATENT DOCUMENTS

| EP | 1065856 | 1/2001 | H04L 27/36 |
|---|---|---|---|
| EP | 1499027 | 1/2005 | H04B 1/04 |

OTHER PUBLICATIONS

Lang et al.; "CORDIC-based computation of ArcCos and ArcSin"; IEEE International Conference on Application-Specific Systems, Architectures and Processors; pp. 132-143, 1997.
Extended European Search Report; Application No. 12172073.4-1525; pp. 9, Oct. 22, 2012.
Office Action received for European Patent Application No. 12172073.4, mailed on Feb. 5, 2014, 4 pages.

\* cited by examiner

*Primary Examiner* — Vineeta Panwalkar
(74) *Attorney, Agent, or Firm* — Baker Botts L.L.P.

(57) ABSTRACT

In accordance with some embodiments of the present disclosure, a method for estimating and correcting phase shift in a wireless communication device, may include converting a digital signal output by digital circuitry of the wireless communication device into a compensated digital signal based on a calculated phase error. The method may also include converting the compensated digital signal into a wireless communication signal. The method may additionally include calculating an estimated instantaneous reference phase of the digital signal output by the digital circuitry. The method may further include calculating an estimated transmit phase of the wireless communication signal. Moreover, the method may include calculating a phase error based on a difference between the estimated instantaneous reference phase and the estimated transmit phase of the wireless communication signal.

18 Claims, 3 Drawing Sheets

| Pout (dBM) | PHASE ERROR |
| --- | --- |
| 24 | $\varphi_1$ |
| 22 | $\varphi_2$ |
| 18 | $\varphi_3$ |
| ⋮ | ⋮ |
| 0 | $\varphi_{15}$ |
| -50 | $\varphi_{16}$ |

# SYSTEM AND METHOD FOR ESTIMATING AND CORRECTING PHASE SHIFT IN A WIRELESS COMMUNICATION DEVICE

TECHNICAL FIELD

The present disclosure relates generally to wireless communication and, more particularly, to estimating and correcting phase shift in a wireless communication device.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal such as radio, television, or other telecommunications. Transmitters often include digital signal processing circuits which encode a data signal, upconverts it to a radio frequency signal, and passes it signal amplifiers which receive the radio-frequency, amplify the signal by a predetermined gain, and transmit the amplified signal through an antenna. On the other hand, a receiver is an electronic device which, also usually with the aid of an antenna, receives and processes a wireless electromagnetic signal. In certain instances, a transmitter and receiver may be combined into a single device called a transceiver.

Many wireless transceivers may suffer from phase shifts in a transmit path due to changes in radio frequency (RF) gain, bias, and/or load of the transmit path. Such phase shifts may cause numerous problems in a wireless communication device. For example, random signal phase shifts may cause magnitude measurement errors when a coherent receiver is used, and the magnitude error signal is generated from the difference between the coherent receiver output and a reference waveform. These signal phase distortions in RF gain stages of a transmit path may contribute to differential non-linear errors (DNLEs) in wireless transmitters. Such DNLEs may accumulate throughout the transmit path, leading to integral non-linear gain error (INLE). Such DNLEs and INLE may lead to degradation of power accuracy at the output of the transmit path. Such phase shifts may also result in degradation of adjacent channel leakage ratio (ACLR) and error vector magnitude (EVM) in a wireless communication device, and/or loss or carrier tracking synchronization between the wireless communication device and a base station, potentially leading to dropped calls and/or other performance degradation.

SUMMARY

In accordance with some embodiments of the present disclosure, a method for estimating and correcting phase shift in a wireless communication device, may include converting a digital signal output by digital circuitry of the wireless communication device into a compensated digital signal based on a calculated phase error. The method may also include converting the compensated digital signal into a wireless communication signal. The method may additionally include calculating an estimated instantaneous reference phase of the digital signal output by the digital circuitry. The method may further include calculating an estimated transmit phase of the wireless communication signal. Moreover, the method may include calculating a phase error based on a difference between the estimated instantaneous reference phase and the estimated transmit phase of the wireless communication signal.

Technical advantages of one or more embodiments of the present disclosure may include real time phase compensation for absolute and relative phase variations based on operating temperature, frequency, modulation scheme, power levels, and/or battery voltage.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
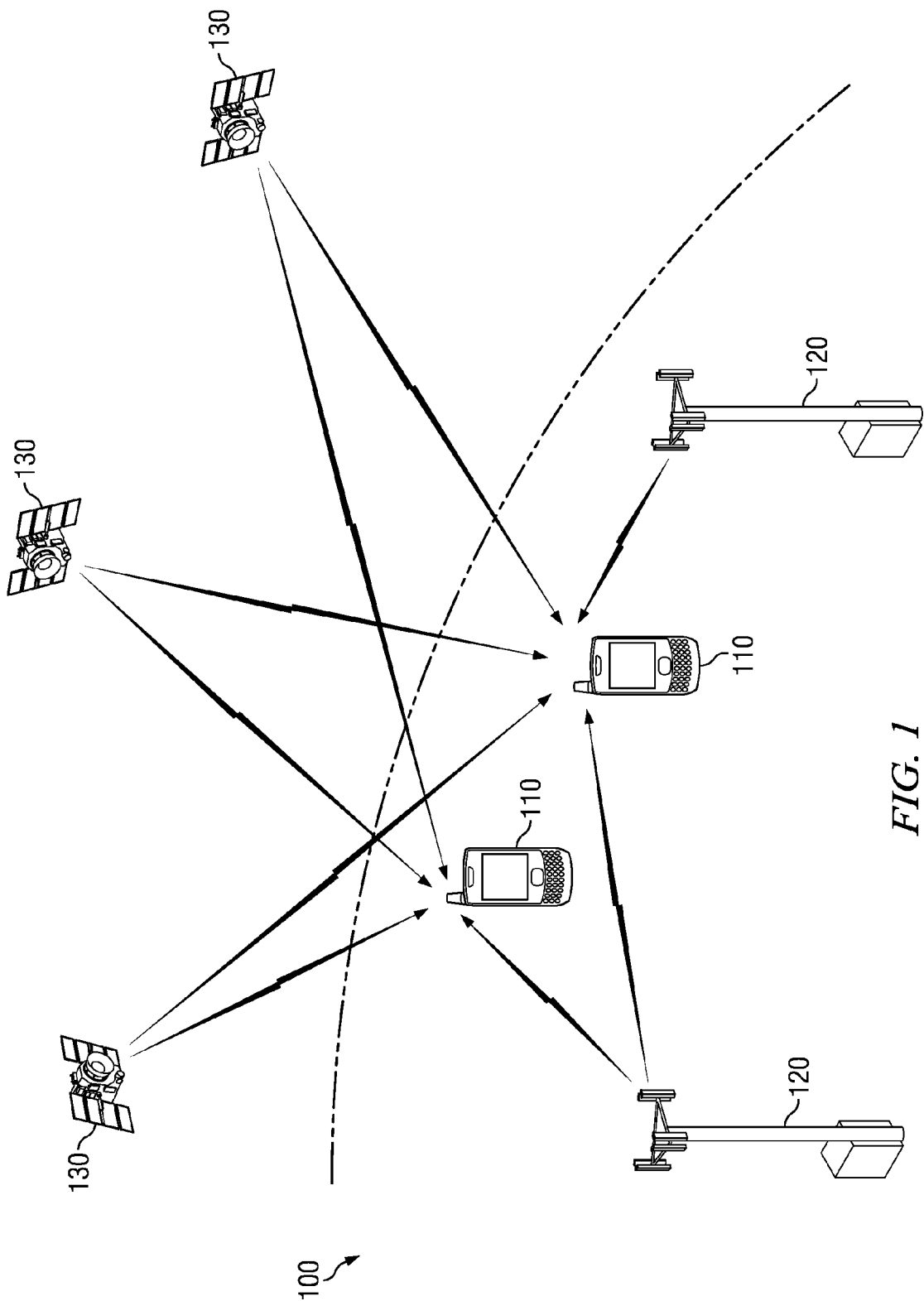
FIG. 1 illustrates a block diagram of an example wireless communication system, in accordance with certain embodiments of the present disclosure.

FIG. 1 illustrates a block diagram of an example wireless communication system 100, in accordance with certain embodiments of the present disclosure. For simplicity, only two terminals 110 and two base stations 120 are shown in FIG. 1. A terminal 110 may also be referred to as a remote station, a mobile station, an access terminal, user equipment (UE), a wireless communication device, a cellular phone, or some other terminology. A base station 120 may be a fixed station and may also be referred to as an access point, a Node B, or some other terminology.

A terminal 110 may or may not be capable of receiving signals from satellites 130. Satellites 130 may belong to a satellite positioning system such as the well-known Global Positioning System (GPS). Each GPS satellite may transmit a GPS signal encoded with information that allows GPS receivers on earth to measure the time of arrival of the GPS signal. Measurements for a sufficient number of GPS satellites may be used to accurately estimate a three-dimensional position of a GPS receiver. A terminal 110 may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and any other suitable transmitter.

In FIG. 1, each terminal 110 is shown as receiving signals from multiple transmitting sources simultaneously, where a transmitting source may be a base station 120 or a satellite 130. In certain embodiments, a terminal 110 may also be a transmitting source. In general, a terminal 110 may receive signals from zero, one, or multiple transmitting sources at any given moment.

System 100 may be a Code Division Multiple Access (CDMA) system, a Time Division Multiple Access (TDMA) system, or some other wireless communication system. A CDMA system may implement one or more CDMA standards such as IS-95,, IS-2000, (also commonly known as "1×"), IS-856, (also commonly known as "1×EV-DO"), Wideband-CDMA (W-CDMA), and so on. A TDMA system may implement one or more TDMA standards such as Global System for Mobile Communications (GSM). The W-CDMA standard is defined by a consortium known as 3GPP, and the IS-2000, and IS-856, standards are defined by a consortium known as 3GPP2.

Figure 2:
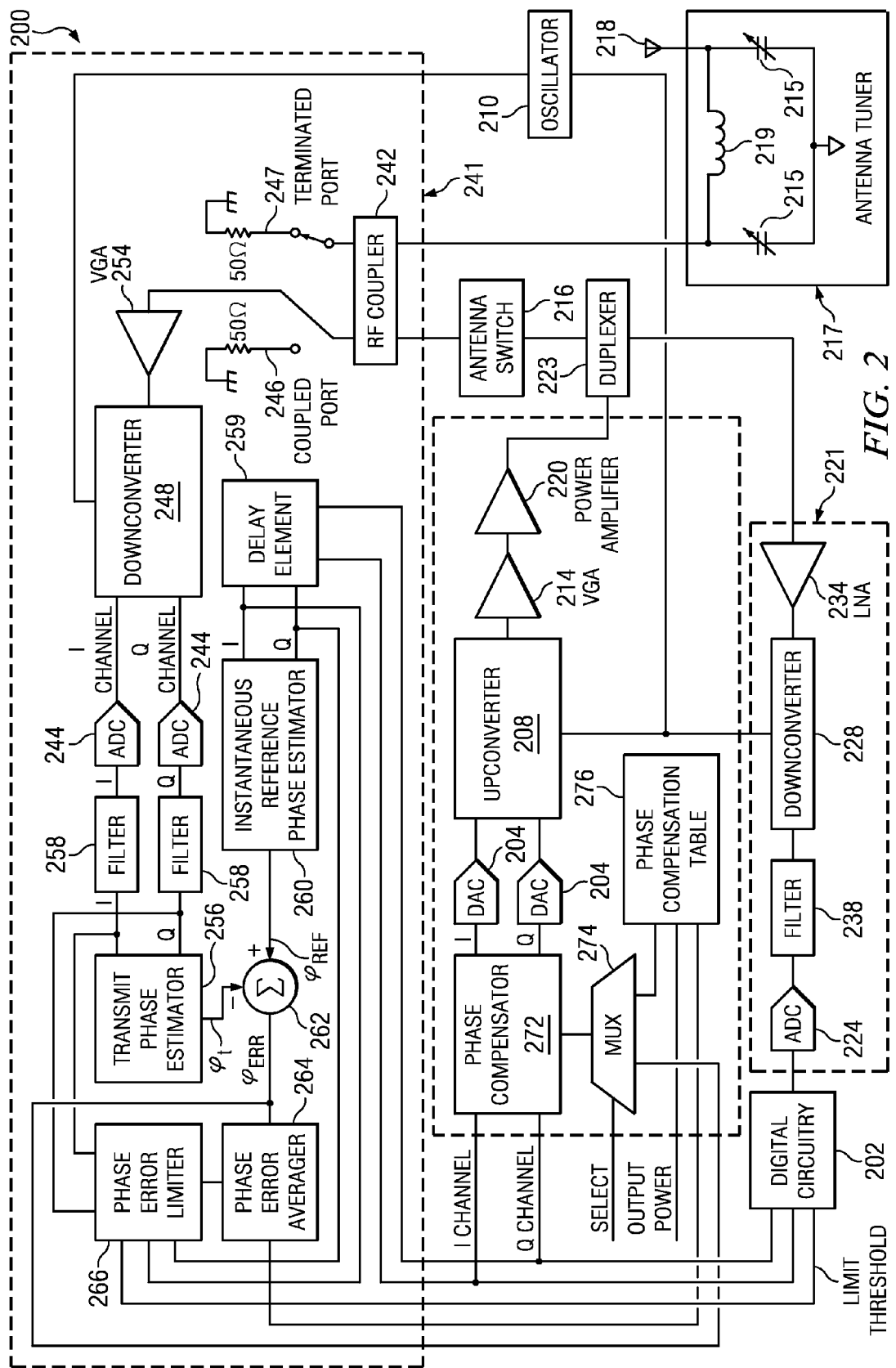
FIG. 2 illustrates a block diagram of selected components of an example transmitting and/or receiving element, in accordance with certain embodiments of the present disclosure.

FIG. 2 illustrates a block diagram of selected components of an example transmitting and/or receiving element 200 (e.g., a terminal 110, a base station 120, or a satellite 130), in accordance with certain embodiments of the present disclosure. Element 200 may include a transmit path 201, a receive path 221, and an phase error estimation path 241. Depending on the functionality of element 200, element 200 may be considered a transmitter, a receiver, or a transceiver.

As depicted in FIG. 2, element 200 may include digital circuitry 202. Digital circuitry 202 may include any system, device, or apparatus configured to process digital signals and information received via receive path 221, and/or configured to process signals and information for transmission via transmit path 201. Such digital circuitry 202 may include one or more microprocessors, digital signal processors, and/or other suitable devices. As shown in FIG. 2, digital circuitry 202 may communicate in-phase (I) channel and quadrature (Q) channel components of a digital signal to transmit path 201.

Transmit path 201 may include phase compensator 272. Phase compensator 272 may include any system, device, or apparatus configured to convert input I and Q channel signals received at its input (e.g., from digital circuitry 202) to output I and Q channels at its output based on a calculated phase error received at another input. The output I and Q channels may be phase shifted such that the phase difference between the output I and Q channels and the input I and Q channels are approximately equal to the calculated phase error. The output of phase estimator 272 may be communicated to digital to analog converters 204.

Multiplexer 274 may communicate the calculated phase error to phase compensator 272. As shown in FIG. 2, multiplexer 274 may select one of two calculated phase errors based on a select signal received at a select input (e.g., a select input received from digital circuitry 202). For example, in the embodiment depicted in FIG. 2, multiplexer 274 may select between an instantaneous phase error $\phi_{err}$ calculated by summer 262 (as described below) and an averaged phase error provided by phase compensation table 276.

Figures 3, 4:
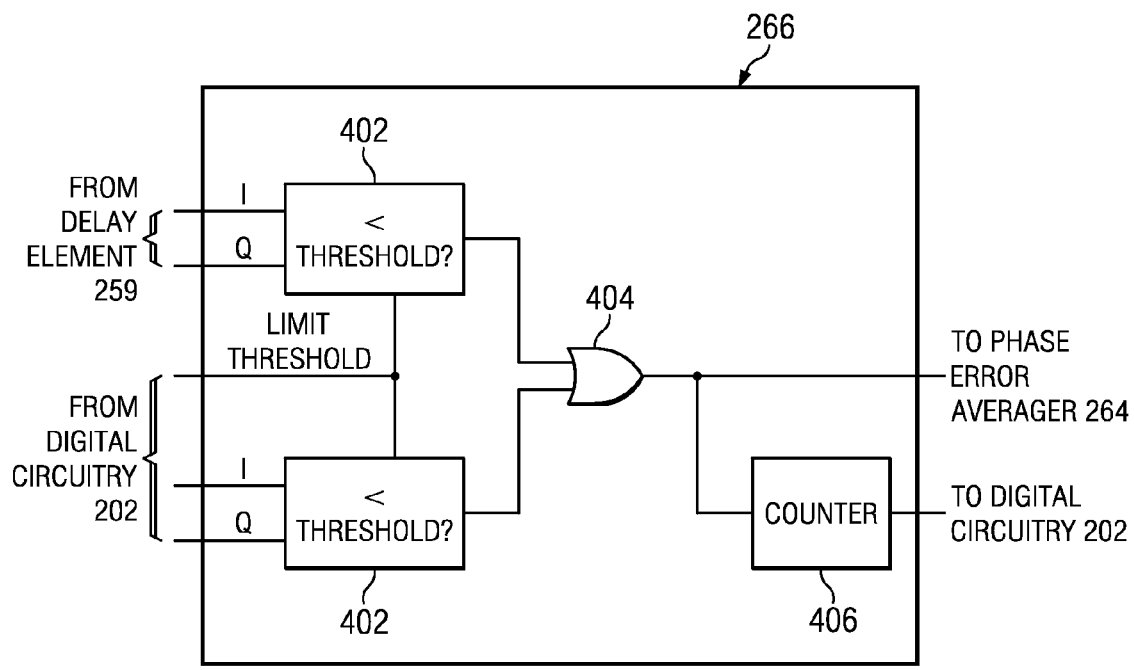
FIG. 3 illustrates a an example phase compensation table for use in the example transmitting and/or receiving element of FIG. 2, in accordance with certain embodiments of the present disclosure.
FIG. 4 illustrates an example phase limiter, in accordance with certain embodiments of the present disclosure.

Phase compensation table 276 may include a memory having stored thereon one or more averaged phase errors, each averaged phase error corresponding to an output power level of transmit path 201. An example embodiment of phase compensation table 276 appears in FIG. 3. As seen in FIG. 3, phase compensation table 276 may comprise a lookup table, such that phase compensation table 276 may, based on an output power level for transmit path 201 communicated to phase compensation table 276 (e.g., from digital circuitry 202), may output an averaged phase error associated with such output power level. In addition, averaged phase error entries of phase compensation table 276 may updated from time to time based on calculated phase error entries received from phase error limiter 266 (as described below).

Transmit path 201 may also include a digital-to-analog converter (DAC) 204 for each of the I channel and Q channel signals communicated by phase compensator 272. Each DAC 204 may be configured to receive its respective I or Q channel component of the digital signal from digital circuitry 202 and convert such digital signal into an analog signal. Such analog signal may then be passed to one or more other components of transmit path 201, including upconverter 208.

Upconverter 208 may be configured to frequency upconvert an analog signal received from DAC 204 to a wireless communication signal at a radio frequency based on an oscillator signal provided by oscillator 210. Oscillator 210 may be any suitable device, system, or apparatus configured to produce an analog waveform of a particular frequency for modulation or upconversion of an analog signal to a wireless communication signal, or for demodulation or downconversion of a wireless communication signal to an analog signal. In some embodiments, oscillator 210 may be a digitally-controlled crystal oscillator.

Transmit path 201 may include a variable-gain amplifier (VGA) 214 to amplify an upconverted signal for transmission, and a power amplifier 220 to further amplify the analog upconverted signal for transmission via antenna 218. The output of power amplifier 220 may be communicated to duplexer 223. A duplexer 223 may be interfaced between antenna switch 216 and each transmit path 201 and receive path 221. Accordingly, duplexer 223 may allow bidirectional communication through antenna tuner 217 and antenna 218 (e.g., from transmit path 201 to antenna 218, and from antenna 218 to receive path 221).

Antenna switch 216 may be coupled between duplexer 224 and antenna tuner 217. Antenna switch 216 may configured to multiplex the output of two or more power amplifiers (e.g., similar to power amplifier 220), in which each power amplifier may correspond to a different band or band class. Antenna switch 216 may allow duplexing of signals received by antenna 218 to a plurality of receive paths of different bands or band classes.

An antenna tuner 217 may be coupled between antenna switch 216 and antenna 218. Antenna tuner 217 may include any device, system, or apparatus configured to improve efficiency of power transfer between antenna 218 and transmit path 201 by matching (or attempting to closely match) the impedance of transmit path 201 to antenna 218. Such matching or close matching may reduce the ratio of reflected power to incident power transferred to the antenna from transmit path 201, thus increasing efficiency of power transfer. As shown in FIG. 2, antenna tuner 217 may include one or more variable capacitors 215 and an inductor 219. The capacitances of variable capacitors 215 may be varied based on one or more control signals communicated from an antenna tuner control (not explicitly shown). As such capacitances are varied, the effective impedance of the combination of antenna tuner 217 and antenna 218 is varied. Thus, by setting the capacitances appropriately, the effective impedance of the combination of antenna tuner 217 and antenna 218 may be approximately matched to that of the remainder of transmit path 201.

Antenna 218 may receive the amplified signal and transmit such signal (e.g., to one or more of a terminal 110, a base station 120, and/or a satellite 130). As shown in FIG. 2, antenna 218 may be coupled to each of transmit path 201 and receive path 221. Duplexer 223 may be interfaced between antenna 218 and each of receive path and Receive path 221 may include a low-noise amplifier 234 configured to receive a wireless communication signal (e.g., from a terminal 110, a base station 120, and/or a satellite 130) via antenna 218, antenna tuner 217, and duplexer 223. LNA 224 may be further configured to amplify the received signal.

Receive path 221 may also include a downconverter 228. Downconverter 228 may be configured to frequency downconvert a wireless communication signal received via antenna 218 and amplified by LNA 234 by an oscillator signal provided by oscillator 210 (e.g., downconvert to a baseband signal). Receive path 221 may further include a filter 238, which may be configured to filter a downconverted wireless communication signal in order to pass the signal components within a radio-frequency channel of interest and/or to remove noise and undesired signals that may be generated by the downconversion process. In addition, receive path 221 may include an analog-to-digital converter (ADC) 224 configured to receive an analog signal from filter 238 and convert such analog signal into a digital signal. Such digital signal may then be passed to digital circuitry 202 for processing.

Phase error estimation path 241 may in general be configured to calculate an estimated reference phase received from digital circuitry 202, an estimated transmit phase of a transmitted signal, calculate an estimated phase error between the estimated reference phase and the estimated transmit phase, and/or communicate one or more signals to transmit path 201 for correction of the calculated estimated phase error. As shown in FIG. 2, phase error estimation path 241 may include a radio frequency (RF) coupler 242. RF coupler 242 may be any system, device or apparatus configured to couple at least a portion of the transmission power in the transmission line coupling antenna switch 216 to antenna tuner 217 to one or more output ports. As known in the art, one of the output ports may be known as a coupled port (e.g., coupled port 246 as shown in FIG. 2) while the other output port may be known as a terminated or isolated port (e.g., terminated port 247 as shown in FIG. 2). In many cases, each of coupled port 246 and terminated port 247 may be terminated with an internal or external resistance of a particular resistance value (e.g., 50 ohms). Due to the physical properties of RF coupler 242, during operation of element 200, coupled port 246 may carry an analog signal (e.g., a voltage) indicative of incident power transmitted to antenna 218 while terminated port 247 may carry an analog signal (e.g., a voltage) indicative of power reflected from antenna 218.

Phase estimation path 241 may include a variable gain amplifier (VGA) 254 to amplify signals communicated from RF coupler 242, and communicate such amplified signals to downconverter 248.

Downconverter 248 may be configured to frequency downconvert the analog signal received from VGA 254 by an oscillator signal provided by oscillator 210 (e.g., downconvert to a baseband signal) and output an in-phase (I) channel and quadrature (Q) channel components of for the signal. In addition, control path 214 may include an analog-to-digital converter (ADC) 244 for each of the I channel and Q channel, each ADC 244 configured to receive the appropriate component of the baseband signal convert such components of the signal into a digital components of the signal.

Phase error estimation path 241 may also include a filter 258 for each of the I channel and Q channel components of the digital signal generated by ADCs 244. In some embodiments, each filter 258 may comprise a moving-average filter (e.g., a cascaded integrator-comb filter) configured to produce at its output a moving average of signals received at its input. As a result, filters 258 may output I channel and Q channel components of the digital signal.

Phase error estimation path 241 may further include transmit phase estimator 256. Transmit phase estimator 256 may include any system, device, or apparatus configured to, based on the I channel and Q channel components of the filtered digital signal output by filters 258, calculate and output signals indicative of the phase $\phi_t$, of the power transmitted to antenna 218. For example, transmit phase estimator 256 may calculate phase in accordance with the equation $\phi_t = \tan^{-1}(P_Q/P_I)$, where $P_I$, is the I channel component of the average power signal, and $P_Q$, is the Q channel component of the average power signal.

Phase error estimation path 241 may additionally include a delay element 259. Delay element 259 may include any system, device, or apparatus configured to time delay the I channel and Q channel components output by digital circuitry 202 such that the delayed signals are delayed from the input signals to delay element 259 by a time delay approximately equal to the time delay from the output of digital circuitry 202 to the input of transmit phase estimator 256.

Phase error estimation path 241 may also include instantaneous reference phase estimator 260. Instantaneous reference phase estimator 260 may include any system, device, or apparatus configured to, based on the I channel and Q channel components of the delayed I channel and the Q channel components from the output of digital circuitry 202, calculate and output signals indicative of the phase $\phi_r$, at the output of delay element 259. For example, instantaneous reference phase estimator 260 may calculate reference power phase in accordance with the equation $\phi_r = \tan^{-1}(P_Q/P_I)$, where $P_I$, is the I channel component of the output at delay element 259, and $P_Q$, is the Q channel component of the output at delay element 259.

Phase error estimation path 241 may further include summer 262. Summer 262 may include any system, device, or apparatus configured to calculate a phase error $\phi_{ERR}$, as the difference between the instantaneous reference phase $\phi_r$, output by instantaneous reference phase estimator 260 and the transmit phase $\phi_t$, output by transmit phase estimator 256. Phase error $\phi_{ERR}$, may represent a parasitic phase shift added by transmit path 201 to a signal output by digital circuitry 202. As shown in FIG. 2, such phase error $\phi_{ERR}$, may be communicated to multiplexer 274, where phase error $\phi_{ERR}$, may be selected by multiplexer 274 as the calculated error used by phase compensator 272 to compensate for phase shift occurring in transmit path 201. Alternatively or in addition, phase error $\phi_{ERR}$, may be communicated to phase error averager 264.

Phase error averager 264 may comprise any system, device, or apparatus configured to computationally average a given number of samples of the calculated phase error $\phi_{ERR}$. The number of samples averaged may be determined by an individual and/or predetermined by a component of wireless communication device 200 (e.g., digital circuitry 202). The purpose of phase error averager may be to reduce or "smooth out" outlier values of calculated phase error $\phi_{ERR}$. The output signal of phase error averager may be communicated to phase compensation table 276. Phase compensation table 276 may, based on the present output power of wireless communication device 200, store a value of the signal output by phase error limiter 266 as an averaged phase error entry corresponding to the present output power. Alternatively or in addition, phase compensation table 276 may, based on the present output power of wireless communication device 200, communicate to multiplexer 274 a signal based on an averaged phase error entry in phase compensation table 276 corresponding to the output power. Accordingly, multiplexer 274 may select between a single current sample of calculated phase error $\phi_{ERR}$, or an averaged phase error generated by phase compensation table 276 and communicate such selection to phase compensator 272.

Phase error estimation path 241 may also include phase error limiter 266. Phase error limiter 266 may include any system, device, or apparatus configured to determine whether a phase of either the reference phase or transmit phase in wireless communication device is outside of an upper and/or lower bound based on a limit threshold (e.g., communicated to phase error limiter by digital circuitry 202 and set by an individual and/or predetermined by a component of wireless communication device 200). Additionally or alternatively, phase error limiter 266 may place an upper and/or lower bound on phase based on I channel and/or Q channel components of the signal output for transmission by digital circuitry 202 as such signal is delayed by delay element 259 and/or an upper and/or lower bound on phase based on I channel and/or Q channel components of the transmitted signal, as output by filters 258.

FIG. 4 illustrates an example phase limiter 266, in accordance with certain embodiments of the present disclosure. As shown in FIG. 4, phase limiter 266 may include one or more threshold detectors 402, a logical OR gate 404, and a counter 406. A threshold detectors 402 may include any system, device, or apparatus for determining whether a phase based on I channel and/or Q channel components of the signal output for transmission by digital circuitry 202 or whether a phase based on I channel and/or Q channel components of the transmitted signal as output by filters 258 are within upper and/or lower bounds. For illustrative purposes, FIG. 4 depicts threshold detectors 402 as determining whether calculated phases are below a certain threshold. Based on its determination, each threshold detector 402 may output a binary signal indicative of the determination. Although FIG. 4 depicts the same limit threshold being applied to each threshold detector 402, in some embodiments, the limit threshold applied to each threshold detector 402 may be different.

Logical OR gate 404 may perform a logical OR of the outputs of threshold detectors 402, thus outputting a signal indicative of a phase measurement outside of threshold bounds if either of threshold detectors 402 outputs a signal indicative of a phase measurement outside of its threshold bounds. The signal output by logical OR gate 404 may be communicated to phase error averager 264, and may function as en enable signal such that, if the output signal of logical OR gate indicates a phase measurement outside of threshold bounds, the output signal may cause phase error averager 264 to output a particular value (e.g., 0) instead of outputting an average of a given number of samples of the calculated phase error $\phi_{ERR}$.

As depicted in FIG. 4, phase error limiter 266 may also include a counter 406, which may be configured to output a count of the number of instances in which logical OR gate 404 outputs a signal indicative of a phase measurement outside of threshold bounds. Counter 406 output may be communicated to digital circuitry 202 for further processing.

Phase error estimation path 241 (e.g., filters 258, transmit phase estimator 256, delay element 259, instantaneous reference phase estimator 260, summer 262, phase error averager 264, and/or phase error limiter 266) may be implemented as one or more microprocessors, digital signal processors, and/or other suitable devices.

Modifications, additions, or omissions may be made to system 100 from the scope of the disclosure. The components of system 100 may be integrated or separated. Moreover, the operations of system 100 may be performed by more, fewer, or other components. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:

1. A wireless communication element, comprising:
a transmit path configured to convert a digital signal output by digital circuitry into a wireless communication signal, the transmit path comprising a phase compensator configured to, based on a calculated phase error, convert the digital signal into a compensated digital signal, such that the transmit path may convert the compensated digital signal into the wireless communication signal; and
a phase error estimation path communicatively coupled to the transmit path and configured to calculate the calculated phase error based on a difference between an estimated instantaneous reference phase of the digital signal output by the digital circuitry and an estimated transmit phase of the wireless communication signal;
a summer configured to calculate a single-sample phase error equal to a difference between the estimated instantaneous reference phase and the estimated transmit phase;
a phase error averager configured to calculate an averaged phase error based on a given number of samples of the single-sample phase error; and
a phase compensation table configured to:
store the averaged phase error average as an entry in the table corresponding to a present output power of the transmit path; and
communicate a signal indicative of the value of the entry in the table corresponding to the present output power;
wherein the transmit path is configured to select the value of the entry in the table corresponding to the present output power as the calculated phase error.

2. A wireless communication element according to claim 1, the phase error estimation path comprising:
an instantaneous reference phase estimator configured to calculate the estimated instantaneous reference phase based on in-phase and quadrature components of the digital signal output by the digital circuitry; and
a transmit phase estimator configured to calculate the estimated transmit phase based on in-phase and quadrature components of the wireless communication signal.

3. A wireless communication element according to claim 1, the phase error estimation path further comprising a phase error limiter configured to limit the averaged phase error to at least one of an upper bound and a lower bound based on at least one of a given limit threshold and in-phase and quadrature components of the digital signal output by the digital circuitry.

4. A wireless communication element according to claim 1, the phase error estimation path further comprising a delay element configured to delay the digital signal output by the digital circuitry such that the delayed signal is delayed from digital signal the time delay approximately equal to a signal delay of the transmit path.

5. A wireless communication element according to claim 1, wherein the transmit path is configured to select between the single-sample phase error and the value of the entry in the table corresponding to the present output power as the calculated phase error.

6. A wireless communication element according to claim 1, wherein the estimated instantaneous reference phase of the digital signal is based on a delayed signal having a time delay from the digital signal approximately equal to a signal delay of the transmit path.

7. A method for estimating and correcting phase shift in a wireless communication device, comprising:
converting a digital signal output by digital circuitry of the wireless communication device into a compensated digital signal based on a calculated phase error;
converting the compensated digital signal into a wireless communication signal;
calculating an estimated instantaneous reference phase of the digital signal output by the digital circuitry based on the delayed signal;
calculating an estimated transmit phase of the wireless communication signal;
calculating a phase error based on a difference between the estimated instantaneous reference phase and the estimated transmit phase of the wireless communication signal;
calculating a single-sample phase error equal to the difference between the estimated instantaneous reference phase and the estimated transmit phase;
calculating an averaged phase error based on a given number of samples of the single-sample phase error;
storing the averaged phase error average as an entry in a phase compensation table, the entry corresponding to a present output power of the wireless communication signal;
communicating a signal indicative of the value of the entry in the table corresponding to the present output power; and
selecting the value of the entry in the table corresponding to the present output power as the calculated phase error.

8. A method according to claim 7, wherein calculating the estimated instantaneous reference phase includes calculating a phase based on in-phase and quadrature components of the digital signal output by the digital circuitry.

9. A method according to claim 7, wherein calculating the estimated transmit phase includes calculating a phase based on in-phase and quadrature components of the wireless communication signal.

10. A method according to claim 7, further comprising selecting between the value of the entry in the table corresponding to the present output power and the single-sample phase error as the calculated phase error.

11. A method according to claim 7, further comprising limiting the averaged phase error to at least one of an upper bound and a lower bound based on at least one of a given limit threshold and in-phase and quadrature components of the digital signal output by the digital circuitry.

12. A method according to claim 7, further comprising delaying the digital signal output by the digital circuitry such that the delayed signal is delayed from the digital signal a time delay approximately equal to a signal delay of a transmission path.

13. Non-transitory computer readable memory including logic operable, when executed, to:
convert a digital signal output by digital circuitry of a wireless communication device into a compensated digital signal based on a calculated phase error;
convert the compensated digital signal into a wireless communication signal;
calculate an estimated instantaneous reference phase of the digital signal output by the digital circuitry based on the delayed signal;
calculate an estimated transmit phase of the wireless communication signal; and
calculate a phase error based on a difference between the estimated instantaneous reference phase and the estimated transmit phase of the wireless communication signal;
calculate a single-sample phase error equal to the difference between the estimated instantaneous reference phase and the estimated transmit phase;
calculate an averaged phase error based on a given number of samples of the single-sample phase error;
store the averaged phase error average as an entry in a phase compensation table, the entry corresponding to a present output power of the wireless communication signal;
communicate a signal indicative of the value of the entry in the table corresponding to the present output power; and
select the value of the entry in the table corresponding to the present output power as the calculated phase error.

14. The non-transitory computer readable memory of claim 13, wherein calculating the estimated instantaneous reference phase comprises calculating a phase based on in-phase and quadrature components of the digital signal output by the digital circuitry.

15. The non-transitory computer readable memory of claim 13, wherein calculating the estimated transmit phase comprises calculating a phase based on in-phase and quadrature components of the wireless communication signal.

16. The non-transitory computer readable memory of claim 13, wherein the logic is further operable, when executed, to select between the value of the entry in the table corresponding to the present output power and the single-sample phase error as the calculated phase error.

17. The non-transitory computer readable memory of claim 13, wherein the logic is further operable, when executed, to limit the averaged phase error to at least one of an upper bound and a lower bound based on at least one of a given limit threshold and in-phase and quadrature components of the digital signal output by the digital circuitry.

18. The non-transitory computer readable memory of claim 13, wherein the logic is further operable, when executed, to delay the digital signal output by the digital circuitry such that the delayed signal is delayed from the digital signal a time delay approximately equal to a signal delay of a transmission path.

* * * * *

UNITED STATES PATENT AND TRADEMARK OFFICE
CERTIFICATE OF CORRECTION

PATENT NO. : 8,891,668 B2  
APPLICATION NO. : 13/173972  
DATED : November 18, 2014  
INVENTOR(S) : Premakanthan et al.

Page 1 of 1

It is certified that error appears in the above-identified patent and that said Letters Patent is hereby corrected as shown below:

Title Page (75) Inventor after "Pravin Premakanthan, Chandler, AZ (US)" please delete "Mahib Rahman" insert -- Mahibur Rahman --.

Signed and Sealed this  
Sixteenth Day of June, 2015

Michelle K. Lee  
*Director of the United States Patent and Trademark Office*